United States Patent [19]
Ouderkirk et al.

[11] Patent Number: 5,858,139
[45] Date of Patent: Jan. 12, 1999

[54] COMPOSITE USED FOR LIGHT CONTROL OR PRIVACY

[75] Inventors: Andrew J. Ouderkirk; Olester Benson, Jr., both of Woodbury; Wayne K. Darvell, North St. Paul; Douglas S. Dunn, Maplewood; Tanya M. Laine, Inver Grove Heights; Donald J. McClure, Shoreview; Lynette M. Miles, Lakeville; Thomas F. Serbus, Centerville; David C. Windorski, Woodbury; Charles D. Hoyle, May Township, all of Minn.

[73] Assignee: Minnesota Mining and Manufacturing Company, St. Paul, Minn.

[21] Appl. No.: 858,306

[22] Filed: May 19, 1997

Related U.S. Application Data

[62] Division of Ser. No. 263,450, Jun. 21, 1994, abandoned.

[51] Int. Cl.$^6$ ................................. B31B 1/60; G09C 3/00
[52] U.S. Cl. ................................. 156/60; 283/73; 283/94; 380/54
[58] Field of Search ............................. 428/167; 156/60, 156/277, 598; 283/73, 94, 9.1, 9.2; 380/54, 55

[56] References Cited

U.S. PATENT DOCUMENTS

| | | | |
|---|---|---|---|
| 3,689,346 | 9/1972 | Rouland | 156/245 |
| 4,033,059 | 7/1977 | Hutton et al. | 428/916 |
| 4,127,693 | 11/1978 | Lemelson | 428/163 |
| 4,812,709 | 3/1989 | Dudasik | 313/478 |
| 5,171,624 | 12/1992 | Walter | 428/156 |
| 5,301,987 | 4/1994 | Nesis | 283/73 |

FOREIGN PATENT DOCUMENTS

| | | |
|---|---|---|
| 0 583 977 A1 | 7/1990 | European Pat. Off. . |
| A40 05 933 | 8/1991 | Germany . |
| WOA90 10886 | 9/1990 | WIPO . |

OTHER PUBLICATIONS

Neues Aus Der Technik, No. 4, 15 Dec. 1988 Wurzburg DE, page 4, "Light–Valve Display" Translation.

IBM Technical Disclosure Bulletin, vol. 14, No. 8, Jan. 1972 New York, US, p. 2463, K. L. Foster et al. "Antiglare and reflection covers for transparent surfaces".

*Primary Examiner*—Donald Loney

[57] ABSTRACT

A composite including a polymeric film having a first generally planar major surface and an opposite second major surface defined by a multiplicity of elongate parallel contiguous ridge portions. The ridge portions each have a generally triangular cross section and elongate obscured and transmitting second major surface portions intersecting at the apex of the ridge with the obscured second major surface portion being on the side of the ridge generally facing a first end of the sheet and the transmitting second major surface portions being on the side of the ridge portions adjacent a second end of the sheet. The film can provide visual transmission between its first major surface and the transmitting second major surface portions while coatings along the obscured second major surface portions prevent viewing of visual images through the film; whereas the composite can also provide light transmission between the first major surface and the transmitting second major surface portions, while the coatings along the obscured second major surface portions restrict light transmission.

2 Claims, 6 Drawing Sheets

COMPOSITE USED FOR LIGHT CONTROL OR PRIVACY

This is a division of application Ser. No. 08/263,450 filed Jun. 21, 1994 now abandoned.

TECHNICAL FIELD

This invention relates to composites used for light control (i.e., composites that will only pass light along predetermined paths), or composites used for privacy (i.e., composites for covering objects such as computer screens or the like that will restrict viewing of those objects to persons looking at those objects from predetermined orientations relative to a major surface of the composite).

BACKGROUND OF THE INVENTION

Composites are known that will only pass light along predetermined paths through the composite and/or can be used to cover objects such as computer screens or the like to thereby restrict viewing of those objects to persons looking at those objects from predetermined orientations relative to a major surface of the composite. One known composite of this type consists of elongate parallel alternate layers of opaque and transparent materials extending between opposite major side surfaces and opposite ends of the composite so that images can only be seen through the composite when it is viewed at generally a right angle to the major surfaces of the composite, and light can only pass through the composite at that same angle. Such composites have been made by photolithography, microreplication, or skiving. While such composites are useful for some purposes, they can be expensive to make, they restrict viewing images or direct light in patterns that are not entirely suitable for some applications, and some absorb light so that they darken the image of the object.

DISCLOSURE OF THE INVENTION

The present invention provides a composite that can be adapted for use as a light control film to direct light in novel patterns that are useful for many applications; and can be adapted for use as a privacy composite that can not only be used to cover objects such as computer screens, but also can advantageously be used to cover documents to thereby restrict viewing of those objects to persons looking at those objects from different, more desirable predetermined orientations relative to a major surface of the privacy composite than can the known composites described above. The light control and/or privacy composite according to the present invention is less expensive to make than the prior art light control composite described above, is flexible and light in weight, and can fairly easily be adapted to provide different viewing or light transmission orientations relative to a major surface of the privacy composite to accommodate different applications for which it may be used.

The composite according to the present invention comprises a polymeric film having a first generally planar major surface defined by a sheet-like main portion having a generally rectangular cross section; and a multiplicity of elongate parallel contiguous ridge portions joined to and projecting less than 2 millimeters (and preferably less than 1 millimeter) from the side of the main portion opposite the first major surface. The ridge portions define a second major surface for the film and each has a generally triangular cross section and elongate obscured and transmitting second major surface portions intersecting at the apex of the ridge with the obscured second major surface portion being on the side of the ridge adjacent or generally facing the first end of the sheet and the transmitting second major surface portion being on the side of the ridge adjacent the second end of the sheet. The angle between the transmitting second major surface portion of each ridge and an imaginary plane parallel to the first major surface and passing through the apexes of the ridge portions is in the range of 25 to 60 degrees and is preferably in the range of 35 to 40 degrees; whereas the included angle between the transmitting and obscured second major surface portions at the apex of each ridge portion is in the range of 50 to 130 degrees and is preferably about 90 degrees. In the privacy composite, the film provides visual transmission between its first major surface and the transmitting second major surface portions and the privacy composite includes means along the obscured second major surface portions for preventing viewing of visual images through the film; whereas in the light control composite the film provides light transmission between the first major surface and the transmitting second major surface portions, and the composite includes means along the obscured second major surface portions for restricting light transmission through the obscured second major surface portions.

Figure 3:
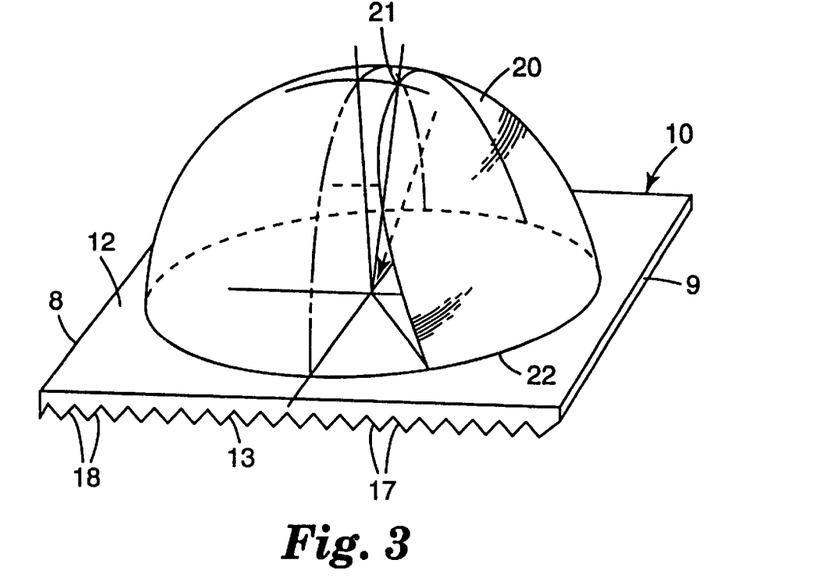
FIG. 3 is a schematic view of a light receiving or viewing area (shown in dark grey) of the composite of FIG. 1.

Such a composite can direct light rays incident on its first major surface through the composite, and/or can afford viewing of objects along its first major surface only along a light receiving or viewing area (see the darkened area of FIG. 3). That light receiving or viewing area is in the shape of about one half of a hemisphere projecting from the second major surface and centered on those rays, is adjacent the second end of the sheet, and is closer in shape to half of a hemisphere at its apex than around its base. The result of a viewing area of that shape is that when the privacy composite is used to cover objects such as documents, the viewing area allows a person at the second end of the privacy composite to quite easily see the document, while persons along the first end or at the sides of the privacy composite are restricted from seeing it.

The means along the obscured second major surface portions for preventing viewing of visual images through the film or for restricting light transmission through the obscured second major surface portions can comprise one or more thin layers of metal over the obscured second major surface portions. In the privacy composite, the metal used in such layers and its thickness is selected to (1) prevent a document along the second side of the film from being read through the obscured second major surface portions, (2) to restrict glare from light reflected back through the first major surface of the film by the metal layer, (3) to provide a pleasing appearance for the film when it is viewed from other than the predetermined orientations relative to its first major surface, and, (4) can also be selected to reflect light incident along the second major surface of the film to thereby help illuminate an object such as a document adjacent to that second major surface.

Suitable layers of metal or other materials along the obscured second major surface portions should have thicknesses in the range of 10 to 1500 nanometers, and preferably have thicknesses in the range of 40 to 100 nanometers. Such layers can, for example, be of aluminum, aluminum oxide, copper, gold or chromium used singly or in combinations. One such combination is thin (e.g., 100 nanometers thick) layers of aluminum over the obscured second major surface portions, and thin (e.g., 10 nanometers thick) layers of aluminum oxide over the layer of aluminum. Such layers of aluminum cause the sheet to have a reflective metallic appearance to persons looking at the first major surface of the film from orientations other than the predetermined orientations at which objects along the second major surface can be viewed. Another such combination which is expensive, but surprisingly effective, is thin (e.g., 10 nanometers thick) layers of chromium over the obscured second major surface portions, and thin (e.g., 100 nanometers thick) layers of gold over the layers of chromium. Such layers of chromium cause the sheet to have a pleasing non-glaring dark metallic appearance to persons looking at the first major surface of the film from orientations other than the predetermined orientations at which objects along the second major surface can be viewed, while the layers of gold are quite reflective to help illuminate objects adjacent the second major surface of the film. Relatively inexpensive yet effective single layers are thin (e.g., 10 nanometers thick) layers of chromium over the obscured second major surface portions, which layers of chromium cause the sheet to have a pleasing non-glaring dark metallic appearance to persons looking at the first major surface of the film from orientations other than the predetermined orientations at which objects along the second major surface can be viewed.

Alternatively, in the privacy composite the means along the obscured second major surface portions for preventing viewing of visual images through the film can be provided by making the obscured second major surface portions sufficiently rough that they are incapable of transmitting visual images (as can be done with the point of a diamond tool); and in either composite that means may be a pigmented or dyed coating.

Protection for the ridges and coatings on the obscured second major surface portions can be provided, which is particularly desirable when the privacy composite is portable to prevent the ridge portions and/or coatings from becoming scratched or otherwise damaged. Such protection for the ridges and coatings can be in the form of a protective transparent polymeric layer attached over the ridges, or such protection for the coatings can be provided by a suitable coating of uniform thickness along the second major surface of the film.

The privacy composite can be incorporated as one wall of a file folder or similar structure adapted to receive documents between adjacent walls, or can be adapted in size and by being three hole punched for use as a cover page in a three ring binder.

The privacy composite can advantageously be used in combination with a sheet-like light source to read a document therebetween; and also, the composite can be used in combination with a sheet-like light source to provide a directional lighting strip.

BRIEF DESCRIPTION OF DRAWING

The present invention will be further described with reference to the accompanying drawing wherein like reference numerals refer to like parts in the several views, and wherein.

DETAILED DESCRIPTION

Figure 1:
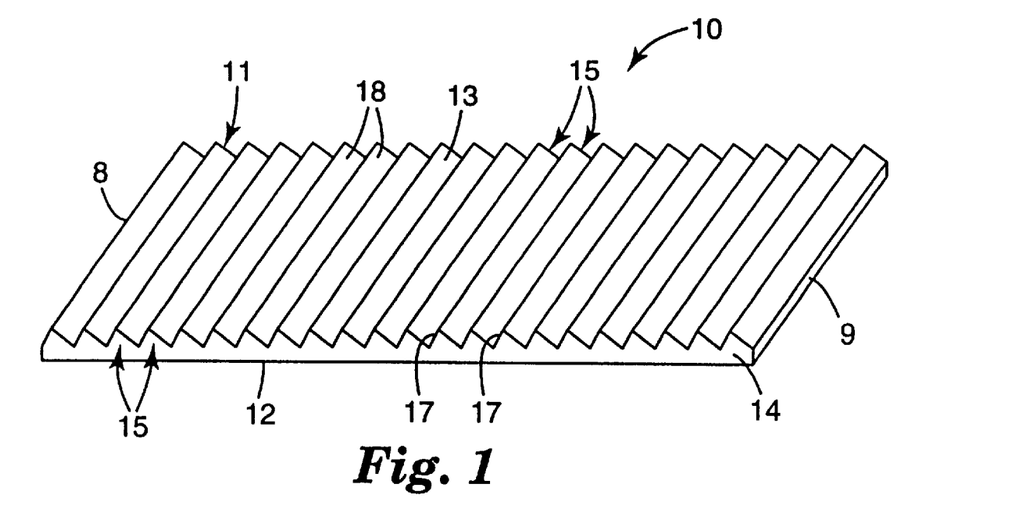
FIG. 1 is a perspective view of a composite according to the present invention having ridge portions thereof much enlarged to show detail.
Figure 2:
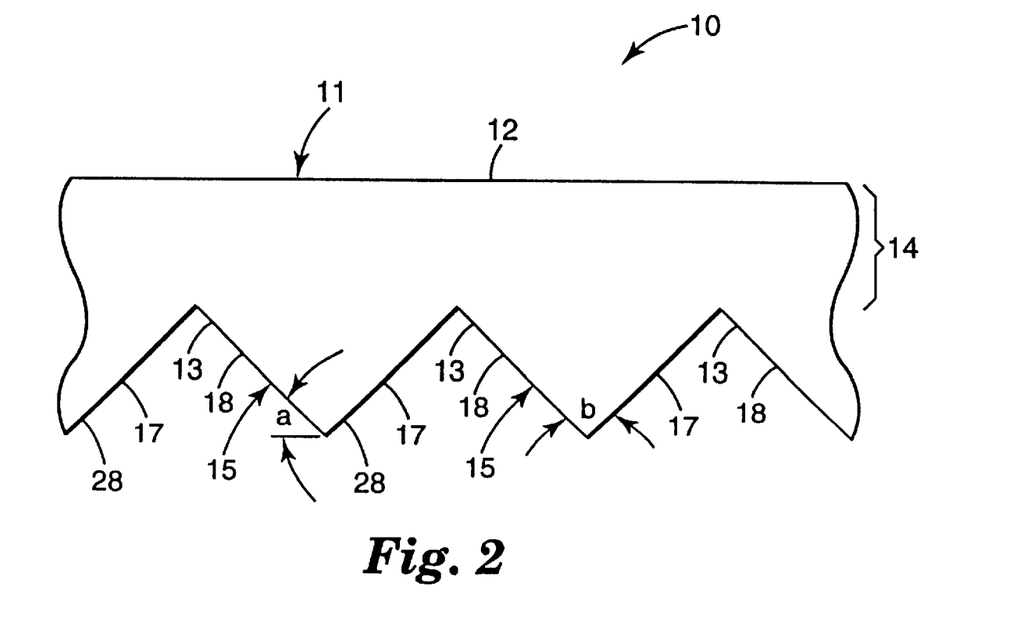
FIG. 2 is a enlarged fragmentary inverted edge view of the composite of FIG. 1.

Referring now to FIGS. 1 and 2 of the drawing, there are shown much enlarged views of a composite according to the present invention generally designated by the reference numeral 10.

Generally the composite 10 comprises a polymeric film 11 having a generally planar first major surface 12, an opposite second major surface 13, and first and second opposite ends 8 and 9. The composite 10 can be adapted and used to direct light from objects (e.g., a lighted instrument panel) adjacent the second major surface 13 of the film 11 only to persons looking at the objects from predetermined orientations relative to the first major surface 12 of the film 11, or can be adapted and used to restrict viewing of objects adjacent the second major surface 13 of the film 11 to persons looking at the objects from predetermined orientations relative to the first major surface 12 of the film 11. The film 11 comprises a main portion 14 having a generally rectangular cross section and defining the first major surface 12; and a multiplicity of elongate parallel contiguous ridge portions 15 joined to and projecting less than 2 millimeters (and preferably less than 1 millimeter) from a side of the main portion 14 opposite the first major surface 12. The ridge portions 15 define the second major surface 13. Each of the ridge portions 15 has a generally triangular cross section with an apex opposite the main portion 14. Also, each of the ridge portions 15 has an elongate obscured second major surface portion 17 and a transmitting second major surface portion 18, which portions 17 and 18 intersect at the apex of the ridge portion 15. The obscured second major surface portions 17 are on the side of the ridge portions 15 adjacent or generally facing the first end 8 of the sheet 11 and the transmitting second major surface portions 18 are on the side of the ridge portions adjacent or generally facing the second end 9 of the sheet 11. The angle "a" between the transmitting second major surface portion 18 and an imaginary plane parallel to the first major surface 12 and passing through the apexes of the ridge portions 15 (see FIG. 2) is in the range of 25 to 60 degrees, and the included angle "b" between the transmitting and obscured second major surface portions 18 and 17 at the apexes of the ridge portions 15 (see FIG. 2) is in the range of 50 to 130 degrees. When the composite 10 is used or adapted for use to control light, the film 11 provides light transmission between its first major surface 12 and its transmitting second major surface portions 18, and the composite 10 includes means along the obscured second major surface portions 17 for restricting light transmission through the obscured second major surface portions 17. When the composite 10 is used for or adapted for use as a privacy composite, the film 11 provides visual transmission between its first major surface 12 and its transmitting second major surface portions 18, and the privacy composite 10 includes means along the obscured second major surface portions 17 for restricting viewing of visual images through the obscured second major surface portions 17.

The composite 10 will direct light rays incident on its first major surface 12 through, or afford viewing of objects along, its first major surface 12 only along a light receiving or viewing area 20 shown as a darkened area in FIG. 3. That light receiving or viewing area 20 is in the shape of about one half of a hemisphere projecting from and having a center along the first major surface 12 and centered on those rays. The light receiving or viewing area 20 is adjacent the second end 9 of the sheet 11 and comes closer to the boundary of half of a hemisphere at its apex 21 than it does around its base 22. When the composite 10 is used to cover objects such as documents with its second major surface 13, that viewing area 20 provides the advantage that a person at the second end 9 of the composite 10 can quite easily see the document, while persons along the first end 8 or the sides of the privacy composite 10 are restricted from seeing it.

Figure 4:
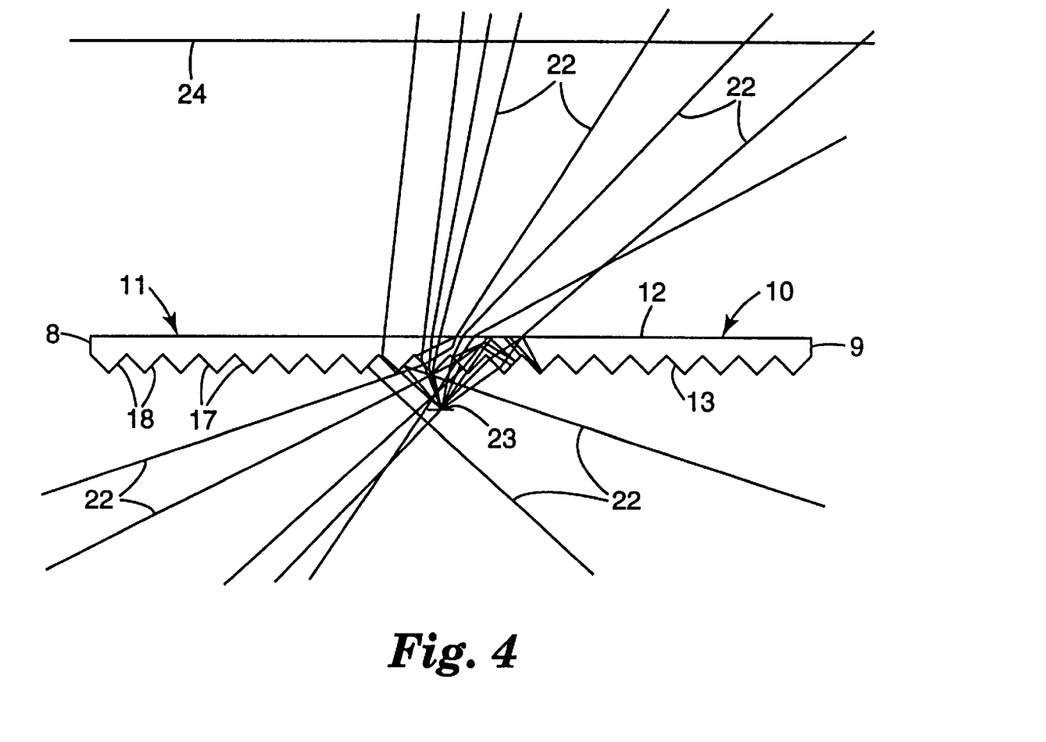
FIG. 4 is a tracing of light rays from a point light source passing through the composite of FIG. 1.
Figure 5:
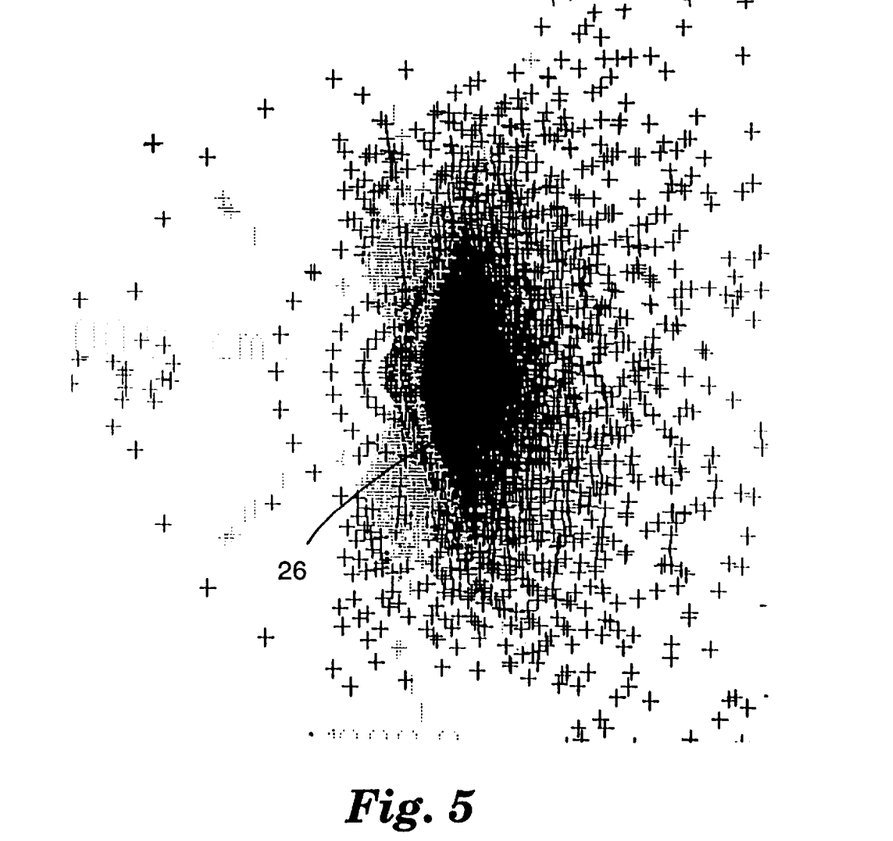
FIG. 5 is a plotting of the intercepts of rays from the light source of FIG. 4 on a plane parallel to and spaced from the composite of FIG. 1.

FIG. 4 illustrates the path of rays 22 directed to the privacy composite 10 from a point light source 23 along the second major surface 13 of the film 11 when the angle "a" is 35 degrees, the angle "b" is 90 degrees, and the material of the film 11 has an index of refraction of 1.6. FIG. 5 is a computer generated diagram illustrating by + signs where the majority of the light rays 22 from the light source 23 would fall on a plane 24 (see FIG. 4) parallel to the first major surface 12 of the film 11 and spaced from the film 11 by a distance about 100 times the spacing between two adjacent ridge portions 15. The + signs form a dark area 26 where the majority of the rays strike the plane 24. By changing the angles "a" and "b" and the material of the film 11, the area in which the majority of the light rays 22 will strike the plane 24 can be moved on the plane 24, and thereby a desired light directing or viewing pattern can be selected for the film 11.

Figure 6:
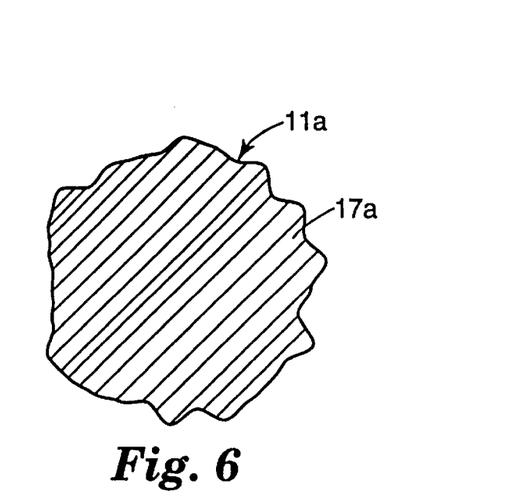
FIG. 6 is an enlarged fragmentary view illustrating a possible modification for obscured second major surface portions on the composite of FIG. 1.

As described above, the means along the obscured second major surface portions 17 for restricting light transmission through the obscured second major surface portions 17 or for restricting viewing of visual images through the obscured second major surface portions can comprise coatings or thin layers 28 of opaque material (e.g., aluminum, aluminum oxide, copper, gold, chromium, pigmented or dyed coatings or multiple layers of such materials) over the obscured second major surface portions 17. Alternatively, as is illustrated in the enlarged fragment of a modified one of the obscured second major surface portions 17a illustrated in FIG. 6, that means for restricting light transmission through the obscured second major surface portions can be provided by the film 11a being sufficiently rough along the obscured second major surface portions 17a (which rough major surface portions 17a can be formed with a diamond tool) to restrict viewing images through the obscured second major surface portions 17a.

Preferably the first major surface 12 has a textured or matte finish which restricts glare along the first major surface of the composite 10. Examples of suitable materials for the film 11 which include ridge portions of the type described above are the acrylic or polycarbonate materials sold under the trade designations "Scotch Brand Optical Lighting Film" (called "SOLF" hereinafter) or "Brightness Enhancement Film" (called "BEF" hereinafter) by Minnesota Mining and Manufacturing Company, St. Paul, Minn. Alternatively, the film 11 can be formed from a layer of polycarbonate, polymethylmethacrylate, polyalkyl (meth) acrylic acid esters, polycarbonate, polystyrene, acrylated epoxies, acrylated urethanes, acrylated polyesters, cellulosic esters, or multifunctional (meth)acrylic acid esters.

When the composite 10 is adapted to be used with its major surfaces 12 and 13 in a generally horizontal orientation, preferably the angle "a" between each transmitting second major surface portion 18 and an imaginary plane parallel to the first major surface 12 and passing through the apexes of the ridge portions 15 is in the range of about 35 to 45 degrees, and the included angle "b" between the transmitting and obscured second major surface portions 18 and 17 is about 90 degrees. Applications for such horizontal use include use as a privacy composite 10 over documents being read on the top surface of a desk or over originals or copies on a copy machine (i.e., over the feeding or receiving stations of the copy machine).

When the composite 10 is adapted to be used with its major surfaces in a generally vertical orientation, preferably the angle "a" between each transmitting second major surface portion 18 and an imaginary plane parallel to the first major surface 12 and passing through the apexes of the ridge portions 15 is in the range of about 30 to 40 degrees, and the included angle "b" between the transmitting and obscured second major surface portions 18 and 17 is about 90 degrees. Applications for such vertical use include use as a privacy composite 10 over the screen on a computer or over a document in a vertically disposed document holder that may, for example, be associated with a computer or typewriter; or use as a light control composite over the face of a lighted instrument dial, or over the lighted instrument cluster of an automobile in which case the light control composite 10 can allow the driver to read the instruments while preventing light from those instruments from being directed toward the windshield.

Figure 7:
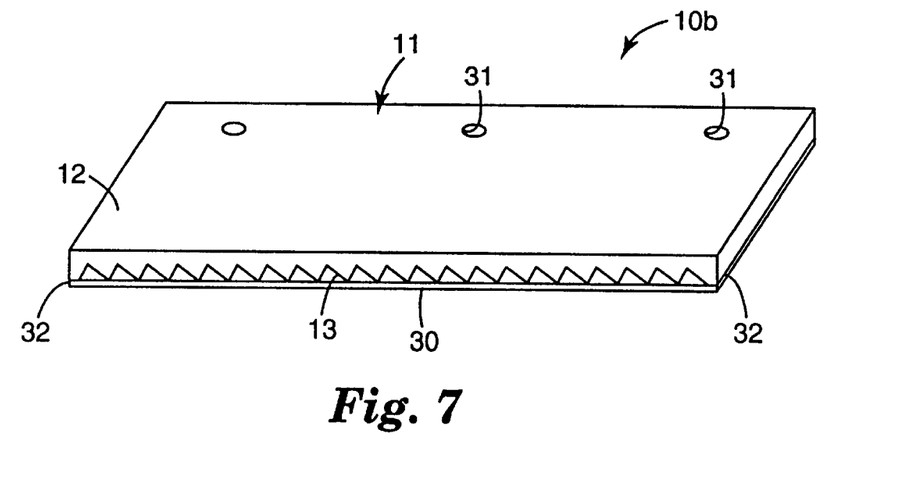
FIG. 7 illustrates certain modifications of the composite of FIG. 1.

Protection for the very small ridge portions 15 and the coatings 28 of opaque material along the obscured second major surface portions 17 should be provided when the composite 10 is portable or otherwise is used in a way that the second major surface 13 of the film 11 could be abraded (e.g., scratched against objects along the top of a desk). As is illustrated in FIG. 7, such protection can be provided in a privacy composite 10b including a film 11 of the type described above by a protective transparent polymeric layer 30 having a periphery 32 corresponding in shape and size to the periphery of the film 11b. The protective transparent polymeric layer 30 overlays the second major surface 13 of the film 11 and the peripheries of the film 11 and the protective transparent polymeric layer 30 are bonded together as by heat sealing or by a suitable adhesive. Alternatively, such protection for those coatings could be provided by a protective transparent outer coating (not illustrated) having a generally uniform thickness over those coatings and the uncoated portions of the second major surface 13. As is illustrated, optionally the privacy composite 10b can be adapted for use as a cover page in a three ring binder by being of the appropriate size and by being punched to form three holes 31.

Figure 8:
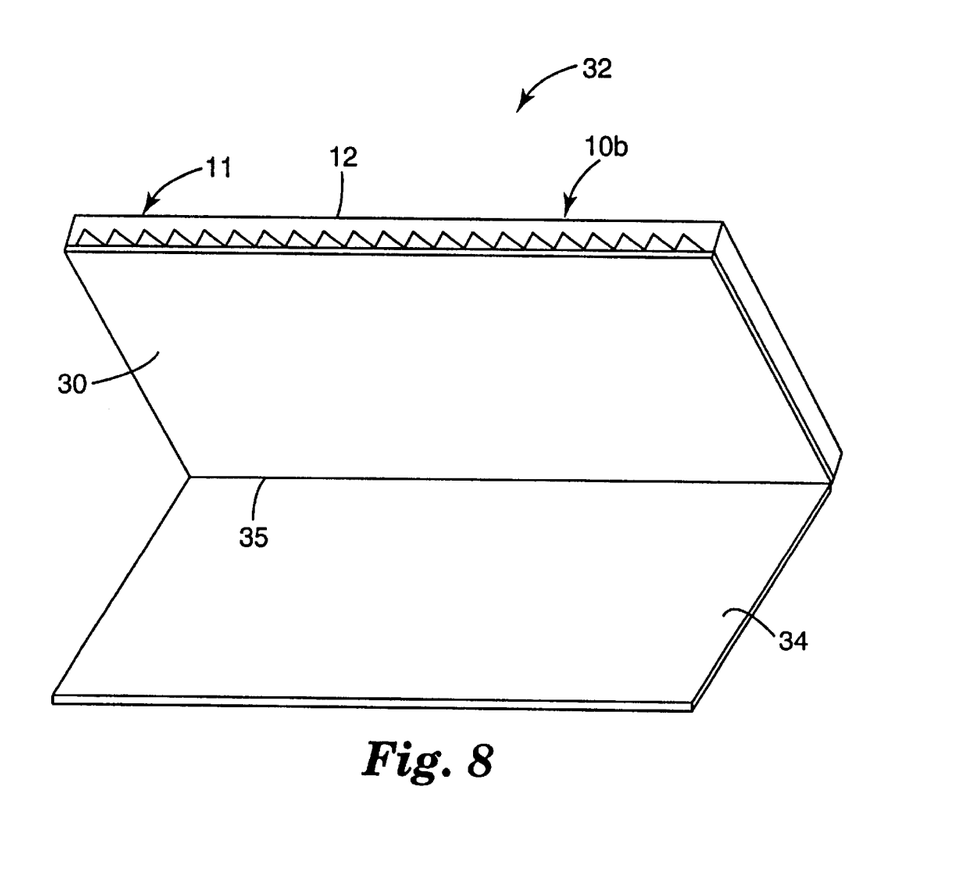
FIG. 8 illustrates the composite of FIG. 1 modified to be incorporated in a folder.

As is illustrated in FIG. 8 the privacy composite 10b described above can be incorporated in or form one side of a folder 32 which also has a second side 34 that is pivotably attached to the privacy composite along one edge 35 and can be positioned along the protective transparent layer 30 to receive a document to be read therebetween. That document could then be read through the first major surface 12 of the film 11. While not illustrated, the privacy composite could also be incorporated as the front wall of an envelope having a second side sealed along all but one side to the privacy composite 10b and adapted to receive documents between that second side and the protective transparent layer 30 of the privacy composite 10b.

Figure 9:
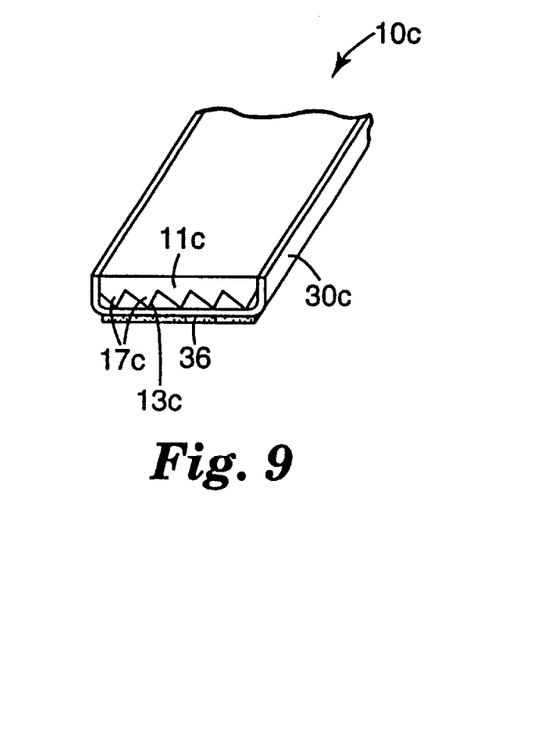
FIG. 9 illustrates a further modification of the composite of FIG. 1.

FIG. 9 illustrates an embodiment 10c of the privacy composite which is elongate in a direction parallel to its ridge portions 17c. The composite 10c has film 11c having the structure of the film 11 described above, and includes a protective transparent polymeric layer 30c having a width and length generally corresponding to the width and length of the film 11c. The protective transparent polymeric layer 30c overlays the second major surface 13c of the film 11c and the film 11c and the protective transparent polymeric layer 30c are bonded together by edge portions of the polymeric layer 30c being adhered or otherwise attached along the edges of the film 11c. The transparent polymeric layer 30c is coated on its side opposite the film 11c with a layer 36 of either repositionable, removable or permanent pressure sensitive adhesive. Such a strip privacy composite 10c could be supplied in strips or on a helically wound roll from which lengths could be removed, and could be adhered over portions of a document to restrict certain written information thereon from other than the reader of that document.

Figure 10:
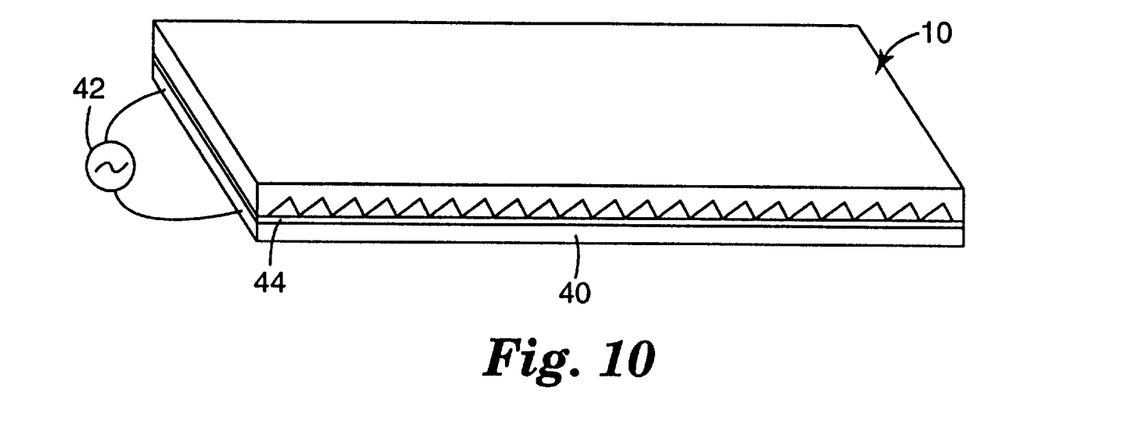
FIG. 10 illustrates the composite of FIG. 1 being used in combination with a sheet-like light source to read a document therebetween.
Figure 11:
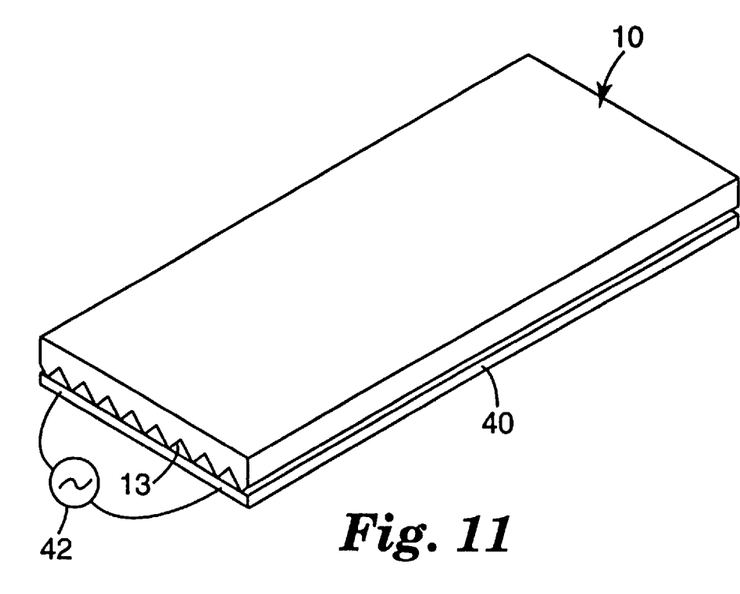
FIG. 11 illustrates the composite of FIG. 11 being used in combination with a sheet-like light source to provide a lighting strip.

As is illustrated in FIGS. 10 and 11, the privacy composite 10 can be used in combination with a sheet-like light source 40 of the type sold by Durel Corporation, Tempe, Ariz., under the trade designation "Durel 3" electroluminescent lamp. When an appropriate A.C. voltage source 42 is connected to that light source 40, it will emit a relatively bright light. As is illustrated in FIG. 10, that sheet-like light source 40 can be used under a document 44 over which the privacy composite 10 is positioned to illuminate that document 44 for a reader (as may be desirable in the dark or under low light conditions). As illustrated in FIG. 11, that sheet-like light source 40 may be used directly along the second major surface 13 of the composite 10 to thereby provide a directional light source which may be useful in the dark or under low light conditions in many places such as along an edge of a computer keyboard to illuminate its keys, or along an edge of a folder to facilitate reading documents in the folder.

The film 11 can be made by extrusion casting/embossing as is described in U.S. Pat. No. 4,097,634; by compression molding as is described in U.S. Pat. Nos. 4,244,683 and 4,601,861; or by casting and curing (the preferred method) as is described in U.S. Pat. Nos. 3,689,346, 5,175,030, and 5,183,597. The contents of the patents listed above in this paragraph are hereby incorporated herein by reference. A thin metal or metal oxide coating can be deposited over both surfaces of the ridges using known vapor coating techniques. Subsequently, that coating can be ablated from the transmitting second major surface portions by the method described in European Patent Specification EP 0583997-A1, the content whereof is incorporated herein by reference.

EXAMPLES

Example 1

SOLF having "a" angles of 45 degrees and "b" angles of 90 degrees and having ridge portions spaced at 360 micrometers was first primed with vapor coated chromium and then coated with 75 nanometers of gold. The film was ablated at a 45 degree angle with respect to its first major surface with a 248 nanometer Lambda Physik LPX315i excimer laser. Depending on the viewing angle, the composite had either a bright gold or transparent appearance from its second major surface. The appearance of the composite from its first major surface varied from a dark purple color to transparent. The composite had less than 5% light transmission in the high extinction viewing range. Ray tracing indicated that this transmission was actually reflection off the metal coated surface of the obscured second major surface portions. The ridge portions of the composite were discernible but did not appear objectionable.

Example 2

Film having "a" angles of 45 degrees and "b" angles of 90 degrees and having ridge portions spaced at 50 micrometers that was pattern replicated from BEF in 50/50 hexanedioldiacrylate/Photomer 6010 with 1 percent Darocur 4265 on 20 mil thick polycarbonate film was metallized with 75 nanometers of chromium. This film was demetallized as described above. The angular performance of the resulting composite was similar to Example 1. The ridge portions of the composite were not visible at any normal viewing distance.

Example 3

A film having "a" angles of 30 degrees and "b" angles of 90 degrees was generated as described in Example 2. Ablation was done at 45 degrees, which may have caused some damage to the metal on the risers. The film was very bright but did not cut off until about—45 degrees.

Example 4

The film of example 1 was coated with a semitransparent coating of 15 nanometers of Aluminum which was reacted with 8 SCCM of oxygen during the deposition to increase the UV absorptivity of the film. The film was ablated as described in Example 1. The film was placed on paper with the grooves down. The viewing angle was identical to the examples with "a" angles of 45 degrees, however the brightness was higher. Surprisingly, the ghost images were not significant. A second, non-overlapping image was visible at high vertical angles.

Example 5

The material produced as described in Example 1 was placed on a cathode ray tube with the ridge portions adjacent the tube. The image was not visible at a normal angle due to the 45 degree "a" angles. The image was clear and free of ghosts over a viewing range from 75 to 85 degrees.

The present invention has now been described with reference to several embodiments and modifications thereof. It will be apparent to those skilled in the art that many changes can be made in the embodiments described without departing from the scope of the present invention. Thus the scope of the present invention should not be limited to the structures described in this application, but only by structures described by the language of the claims and the equivalents of those structures.

We claim:

1. A method for looking at a document bearing confidential indicia along its front surface while restricting viewing of that document by persons looking at the document from predetermined orientations relative to the front surface of the document, said method comprising the steps of:

providing a privacy composite comprising a polymeric film having a first generally planar major surface, an opposite second major surface, first and second opposite ends, a main portion having a generally rectangular cross section and defining said first major surface, and a multiplicity of elongate parallel contiguous ridge portions joined to and projecting less than 2 millimeters from the side of said main portion opposite said first major surface, said ridge portions defining said second major surface, each having a generally triangular cross section with an apex opposite said main portion, and each having elongate obscured and transmitting second major surface portions intersecting at said apex with the obscured second major surface portion being on the side of the ridge generally facing the first end of the sheet and the transmitting second major surface portion being on the side of the ridge generally facing the second end of the sheet, the angle between said transmitting second major surface portion and an imaginary plane parallel to the first major surface and passing through the apexes of the ridge portions being in the range of 25 to 60 degrees, and the included angle between said transmitting and obscured second major surface portions at said apex being in the range of 50 to 130 degrees, said film providing visual transmission between said first major surface and said transmitting second major surface portions, and said privacy composite including means along said obscured second major surface portions for restricting viewing of visual images through said obscured second major surface portion; and positioning the second surface of the privacy composite over the front surface of the document bearing the confidential indicia; and viewing the document through the privacy composite from adjacent the second end of the sheet, while the privacy composite restricts viewing of the document by persons at the first end of the privacy composite and along the sides of the privacy composite.

2. A method according to claim 1 further including the step of positioning a sheet-like light source positioned along the side of the document opposite said privacy composite to help illuminate the document.

* * * * *